Figure 1:
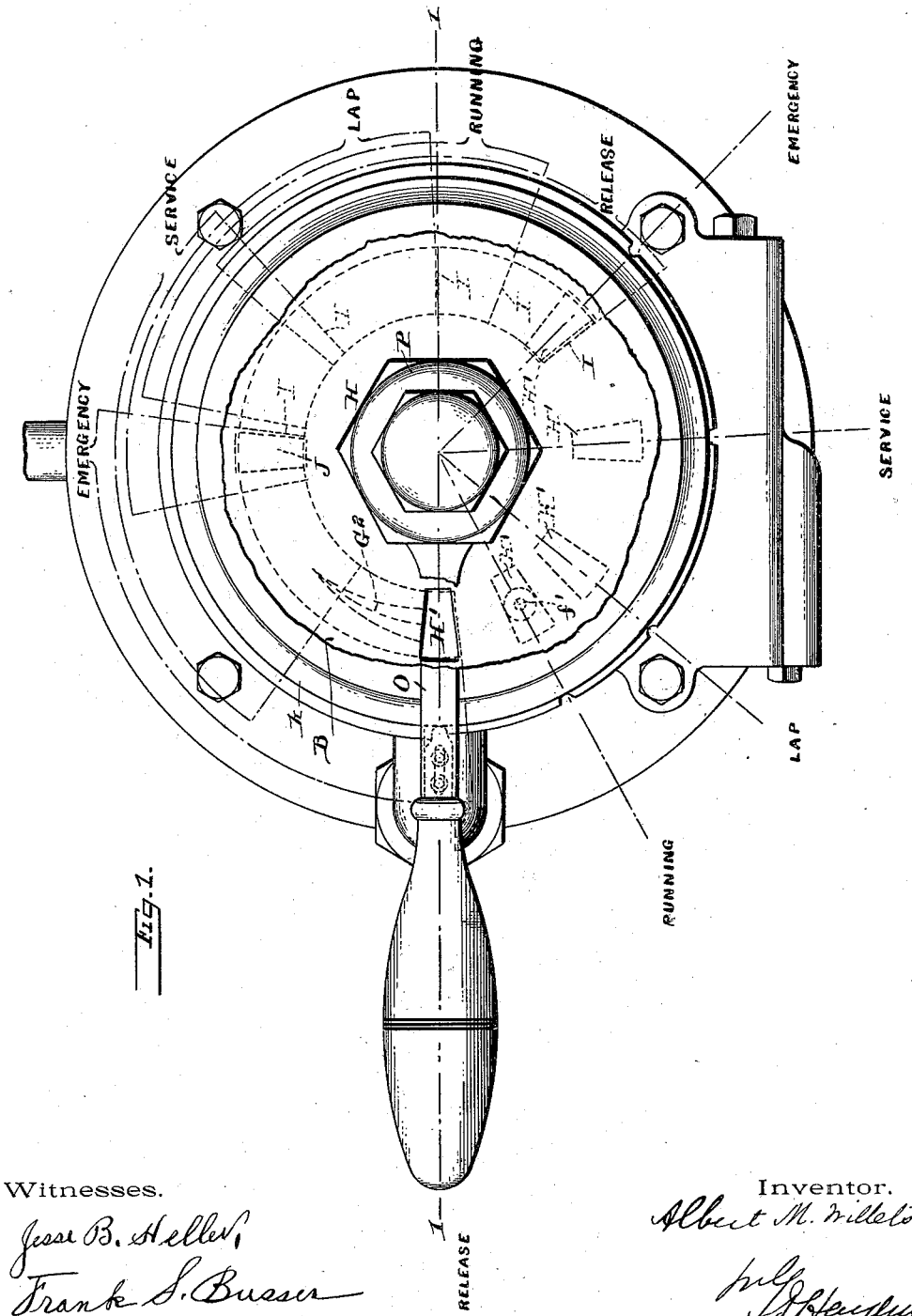

(No Model.) 4 Sheets—Sheet 1.
A. M. WILLETS.
ENGINEER'S VALVE FOR AIR BRAKE SYSTEMS.
No. 561,300. Patented June 2, 1896.

Witnesses.
Jesse B. Heller
Frank S. Busser

Inventor.
Albert M. Willets
J. J. Harding
Attorney.

(No Model.) 4 Sheets—Sheet 2.
A. M. WILLETS.
ENGINEER'S VALVE FOR AIR BRAKE SYSTEMS.
No. 561,300. Patented June 2, 1896.

Witnesses. Inventor.

(No Model.) 4 Sheets—Sheet 3.

A. M. WILLETS.
ENGINEER'S VALVE FOR AIR BRAKE SYSTEMS.

No. 561,300. Patented June 2, 1896.

Witnesses: Jesse B. Heller, Frank S. Busser

Inventor. Albert M. Willets
Attorney.

(No Model.) 4 Sheets—Sheet 4.

A. M. WILLETS.
ENGINEER'S VALVE FOR AIR BRAKE SYSTEMS.

No. 561,300. Patented June 2, 1896.

Witnesses.
Jesse B. Heller
Frank S. Busser

Inventor.
Albert M. Willets

Attorney.

UNITED STATES PATENT OFFICE.

ALBERT M. WILLETS, OF CAMDEN, NEW JERSEY.

ENGINEER'S VALVE FOR AIR-BRAKE SYSTEMS.

SPECIFICATION forming part of Letters Patent No. 561,300, dated June 2, 1896.

Application filed December 6, 1895. Serial No. 571,232. (No model.)

*To all whom it may concern:*

Be it known that I, ALBERT M. WILLETS, a citizen of the United States, residing at Camden, county of Camden, and State of New Jersey, have invented a new and useful Improvement in Engineers' Valves for Air-Brake Systems, of which the following is a full, clear, and exact description, reference being had to the accompanying drawings, which form a part of this specification.

In the engineer's valve used with air-brakes as at present constructed, where there is provided an independent pressure-regulating valve the purpose of which is to provide automatically for the admission of air to the train-pipe and valves on the cars when the pressure in the train-pipe falls below a given point, said regulating-valves are controlled by a connection from the train-pipe. Still, as said valves are now constructed trouble often arises by reason of the back pressure due to initial charging being so great as to prevent this valve from acting until the pressure falls considerably in the train-pipe. Thus often in initially charging the pressure in the train-pipe will be raised considerably above that which it is desired for the train-pipe and the ocal valves on the cars to carry, and the refore exerts a corresponding back pressure upon the regulating-valve, and therefore considerable leakage and reduction of pressure can occur in the train-pipe without the regulating-valve acting to automatically admit pressure to the train-pipe. As a consequence of this it sometimes happens that the pressure in the train-pipe will fall to such an amount as to allow the brakes to be set more or less before the regulating-valve acts to admit the pressure and open the brakes. When this occurs, it can only be rectified by the engineer moving his air-brake valve so as to again bring the full pressure onto the train-pipe.

My invention has primarily for its object to provide a regulating-valve with connection between the same and the train supply-pipe, so as to regulate the pressure in the train-pipe within a very small limit—that is, to hold the pressure constant within this limit notwithstanding leakages.

My invention further consists in a new and novel construction of engineer's valve for air-brake systems which enables the pressure in the train-pipe to be more evenly regulated and more easily adjusted.

The first portion of my invention is adaptable to any of the engineer's valves for air-brakes now in use, and the other portion of my invention, as stated before, consists in a novel construction of the engineer's valve itself.

I will first describe my invention as illustrated in the drawings, and then particularly point out the invention in the claims.

Figure 2:
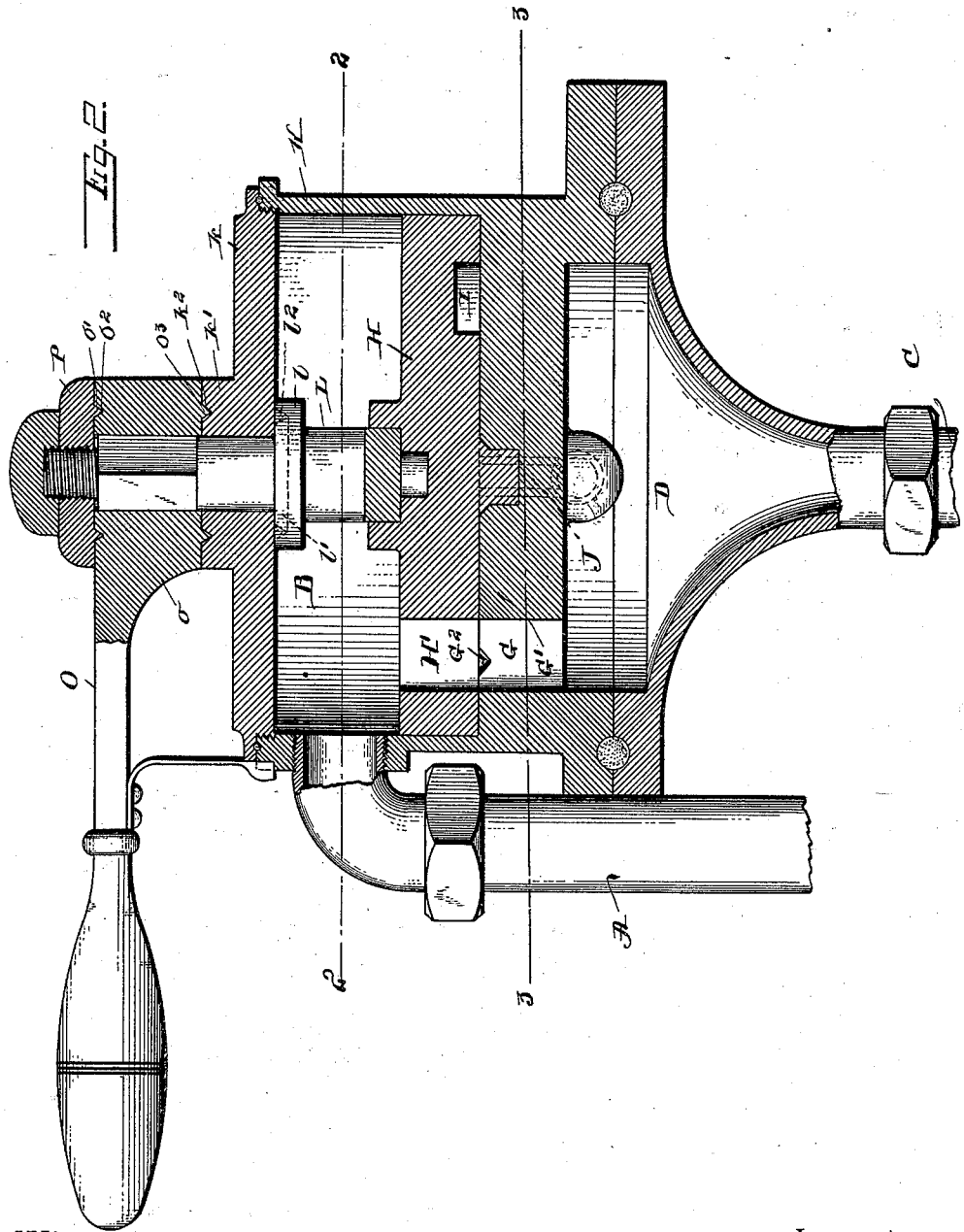
Figure 3:
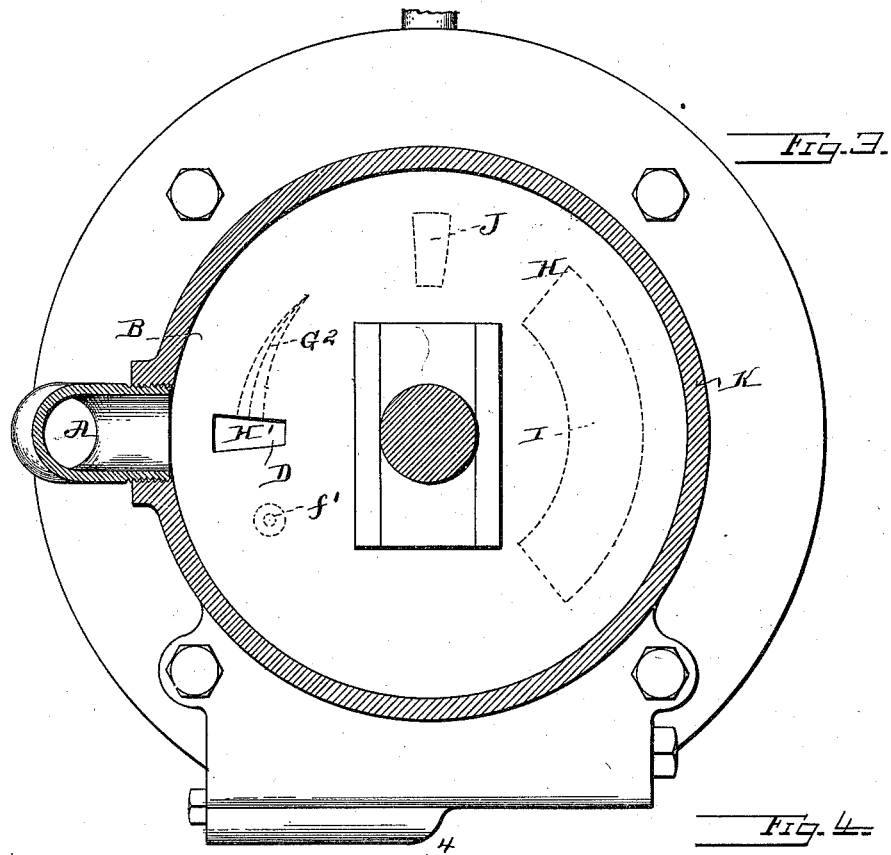
Figure 4:
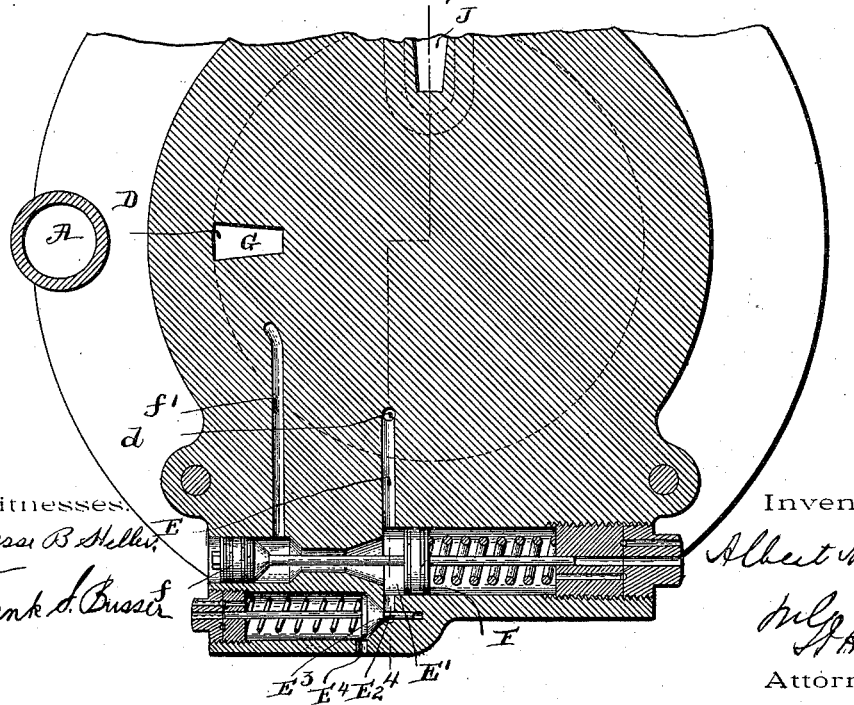
Figure 5:
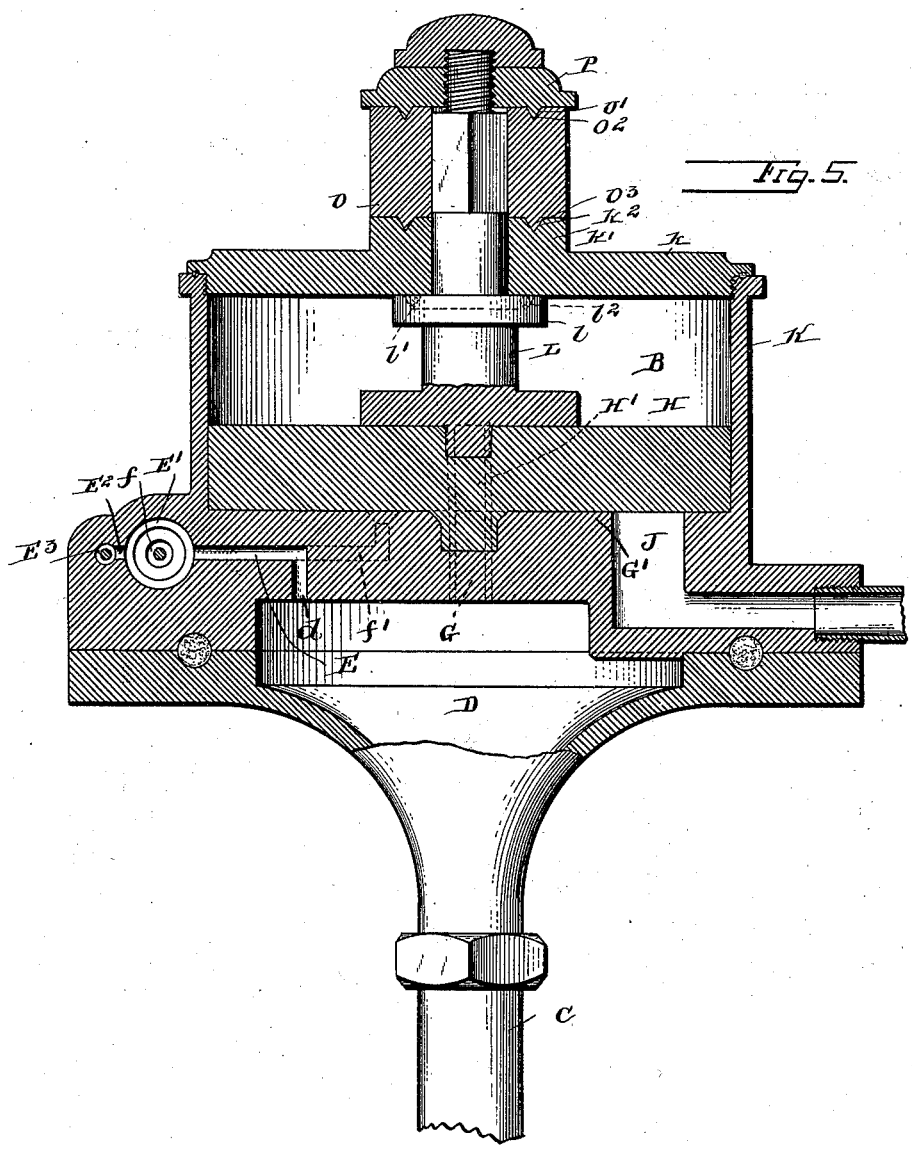

In the drawings, Figure 1 is a diagrammatic plan view of my improved engineer's valve for air-brakes. Fig. 2 is a section on the line 1 1, Fig. 1. Fig. 3 is a section on the line 2 2 of Fig. 2. Fig. 4 is a section on the line 3 3 of Fig. 2. Fig. 5 is a section on the line 4 4 of Fig. 4.

A is the pipe, leading from the main pressure-tank of the air-brake system. This pipe terminates in the chamber B of the valve mechanism.

C is the train service-pipe. The train-pipe terminates in the chamber D of the valve, which chamber is provided with the port $d$, which leads to what I call the "train return-pipe" E. This pipe E terminates in the chamber or cylinder E'. In this cylinder is the spring-acted piston F, controlling a valve $f$. The pipe also connects with the supplemental cylinder $E^2$, having the spring-acted valve $E^3$. The movement of this valve in one direction against the spring opens a connection between the cylinder $E^2$ and the port $E^4$, which port opens into the air. The valve $f$ controls a port $f'$. This port $f'$ extends vertically upward through the valve-seat and terminates directly under the valve.

G is the main service-supply exhaust-port in the valve-seat G'. This valve-seat G' is circular, and has upon it the rotary valve H. This valve has the port H' extending through it and connected at its upper end with the chamber B, and cut in it, on its under face, it has the segmental bridging-port I.

In the valve-seat extending from the port G is a tapering port $G^2$.

J is a port in the valve-seat extending to the atmosphere.

Now to describe the operation of this valve. Supposing it to start initially with the brakes set, the valve is first turned so that the port H' in the valve registers with the port G in the valve-seat, as shown in the accompanying drawings, in which case the air from the pressure-reservoir passes to the chamber B, through the ports H' and G, to the train service-pipe chamber D. The same pressure also passes from the chamber D through the port $d$ to the chamber E', acting upon the piston F. At the same time it also acts upon the valve $E^3$ through its connection $E^2$. This valve, as before stated, is a spring-valve, and is set at the desired pressure which it is desired for the train service-pipe, and therefore the local valves in the cars, to carry. When this pressure is exceeded, the valve $E^3$ is moved over, so as to uncover the port $E^4$, and the excess pressure is exhausted through the port $E^4$. When this occurs, of course it is accompanied by a whistling noise, indicating to the engineer that the train service-pipes have the proper amount of pressure, at which time the engineer turns the valve so that the port H registers with the port $f^2$. (See Fig. 1, position marked "Running.") Air then passes from the chamber B, through the port H', through the port $f'$, into the chamber E', through the pipe E and port $d$, and thence to the train service-pipe. Now in case there should be no leakage when the pressure rises sufficiently to overcome the spring plunger or piston F it moves to the right, so as to cause the valve $f$ to cover the port $f'$, and no air passes to the pipe until the pressure has been reduced by leakage.

In case for any reason the valve F should fail to act the connection between the cylinder E' and the cylinder $E^2$ will cause the excess of pressure above that which the valve $E^3$ is set to pass out through the exhaust. When it is desired to apply the brakes, the valve is turned so that the port I is caused to register with the exhaust-port J and also with the taper-port $G^2$. (See Fig. 1, marked "Service.") This will cause the air from the train service-pipe to pass directly to the exhaust, the length of the port I being sufficient to make this connection between the tapering port $G^2$ and the exhaust-port J. By moving the port I more and more upon the tapering port $G^2$, the port J being constant, the exhaust may take place more and more rapidly, and therefore at such speed as may be desired, and the brakes thus applied at the desired speed.

When it is desired to stop suddenly, the port I is made to register with ports G and J, (see Fig. 1, marked "Emergency,") at which time the exhaust takes place through the full port G and with the greatest rapidity possible.

Most air-brake systems now in use have a valve, which, while not constructed or operating like the piston F and valve $f$, is still operated for the same purpose—that is to say, to control the admission of pressure to the service-pipe, so as to keep the pressure constant after the pipes have been charged, the piston F operating when the pressure rises to move the valve $f$ to close the port $f'$, and when the pressure falls to return it, so as to allow the valve $f$ to uncover the port $f'$. Still, as may be seen, this piston is directly connected with the train service-pipe, and if the initial pressure put in the train-pipe should rise to a great extent it would have to fall a considerable amount before the auxiliary port $f'$ could operate, and therefore the pressure might be reduced in the train-pipe system under these conditions to such an extent as to allow the brakes to be set; but with the addition of the auxiliary valve $E^3$ the moment the pressure rises above the desired amount for the train service-pipe it is relieved immediately at that point.

In practice I make the pressure necessary to move the valve $E^3$ slightly—say a pound or so—in excess of that necessary to move the piston F. I can therefore control the pressure in the train service-pipe within a pound and make its regulation, after the pipe has once been fully discharged and until it is again discharged, perfectly automatic, which is not always possible with the engineer's valves in other arrangements now in use.

One of the greatest advantages which this peculiar construction of valve and valve-seat and the operation forming my invention have is the absolute control which the engineer has in regulating the speed with which he applies his brake.

In my invention, due to the fact of the rotary valve and the tapering port, the engineer has absolute control of the speed with which he can apply the brakes, and the termination of the tapering port in the full port enables him, with practically one single port and outlet, to either apply the brake gradually (at such speed as he desires) or to apply it suddenly when danger requires.

The arrangement of the ports in the valve and valve-seat are such that, if desired, the valve may be turned so that the ports in the valve-seat will not register with any of the ports in the valve. (See Fig. 1, marked "Lap.") This is advantageous, because in case of the train parts it is desirable not to allow the escape of air in either direction, either to exhaust or have further air come in; but to keep the condition of the parts neutral until the defect or damage has been rectified.

In order to prevent any leakage from the chamber B through the valve casing or standard, I employ the following construction: K is the valve-casing, $k$ being the cover. The cover $k$ is screwed upon the main body of casing K. The cover has the upward flange $k'$, having the dovetail grooves $k^2$. L is the standard connected to the valve H and provided contiguous to the cover $k$ with collar $l$. In this collar $l$ is a dovetail groove $l'$, in which dovetail the projection $l^2$ from the under side of the cover rests. The handle O has an orifice surrounding the standard L and provided with a flange portion $o$, provided with a dovetail projection $o^3$, which rests in the groove $k^2$. The upper end of the standard L is threaded and a nut P works in this threaded end against handle O. The under side of this nut is provided with a dovetail projection o', resting in a dovetail groove o² in the handle.

Having now fully described my invention, what I claim, and desire to protect by Letters Patent, is—

1. In an engineer's valve for air-brake system, in combination, a source of pressure supply and train service-pipe, a valve adapted to admit pressure from the source of pressure supply to the train service-pipe, a pressure-valve controlling a port open to the air, and connection between the train service-pipe and one side of said valve independent of the first-mentioned valve.

2. In an engineer's valve for air-brake system, in combination, a source of pressure supply, a train service-pipe, a valve controlling two inlets from the source of supply to the train service-pipe, a pressure-valve controlling one of said last-mentioned inlets, a pressure-valve controlling a port open to the atmosphere, and connection between one side only of the last-mentioned valve mechanisms and the train service-pipe, independent of the first-mentioned valve.

3. In an engineer's valve for air-brake system, in combination, a source of pressure supply, a train service-pipe, a valve controlling two inlets, one direct to the train service-pipe, the other to a supplemental chamber, a supplemental valve controlling said last-mentioned inlet, a piston in said chamber controlling said last-mentioned valve, connection between said chamber and the train service-pipe independent of the first-mentioned valve, a pressure-valve controlling a port open to the atmosphere, and connection between one side only of said valve and the train service-pipe.

4. In an engineer's valve for air-brake system, in combination, a source of pressure supply, a train service-pipe, a valve controlling two inlets, one direct to the train service-pipe, the other to a supplemental chamber, a supplemental valve controlling said last-mentioned inlet, a piston in said chamber controlling said last-mentioned valve, connection between said chamber and the train service-pipe independent of the first-mentioned valve, a pressure-valve controlling a port open to the atmosphere, and connection between one side only of said valve and the last-mentioned chamber.

5. In an engineer's valve for an air-brake system, in combination, a train service-pipe, a valve and valve-seat, the valve-seat having a full port and a tapering port connecting with the train service-pipe, the tapering port terminating in the full port, and an exhaust-port, the valve being provided with a passage adapted to register with both of said ports simultaneously.

6. In an engineer's valve for an air-brake system, in combination a source of pressure supply, a train service-pipe, a rotary valve and seat, the seat being provided with two ports, one of which is provided with a tapered portion, connection from both ports to the train service-pipe, and an exhaust-port, the valve being provided with a port connecting with pressure supply and adapted to register with either of the first-mentioned ports, and a passage adapted to connect the tapered port with the exhaust-port.

7. In an engineer's valve for an air-brake system, in combination, a source of pressure supply, a train service-pipe, a rotary valve and seat, the seat being provided with two ports, one of which is provided with a tapered portion, connection from both ports to the train service-pipe, and an exhaust-port, the valve being provided with a port connecting with pressure supply and adapted to register with either of the first-mentioned ports, and a passage adapted to connect the tapered port with the exhaust-port, the arrangement being such that before the passage in the valve is moved to the tapered port in the valve-seat the port in the valve is moved beyond both ports in the valve-seat.

8. In an engineer's valve for an air-brake system, in combination, a train service-pipe, a source of pressure supply, a valve having a port connecting with air-pressure supply, two ports in the valve-seat adapted to register with the valve-port, one of said ports connecting directly with the train service-pipe, the other connecting with a supplemental chamber, a pressure-valve controlling the opening from said last-mentioned port to the supplemental chamber, valve mechanism in said chamber, and connection between said chamber and train service-pipe, a pressure-valve controlling a port opening into the atmosphere, and connection between one side only of said last-mentioned valve and the train service-pipe.

9. In an engineer's valve for an air-brake system, in combination, a train service-pipe, a source of pressure supply, a valve having a port connecting with air-pressure supply, two ports in the valve-seat adapted to register with the valve-port, one of said ports connecting directly with the train service-pipe, the other connecting with a supplemental chamber, a pressure-valve controlling the opening from said last-mentioned port to the supplemental chamber, valve mechanism in said chamber, and connection between said chamber and train service-pipe, a pressure-valve controlling a port opening into the atmosphere, and connection between one side only of said last-mentioned valve and the supplemental chamber.

In testimony of which invention I have hereunto set my hand.

ALBERT M. WILLETS.

Witnesses:
FRANK S. BUSSER,
MINNIE F. ELLIS.